March 7, 1944.  E. H. SHAFF  2,343,332
IMPACT CLUTCH
Filed Aug. 6, 1941  2 Sheets-Sheet 1
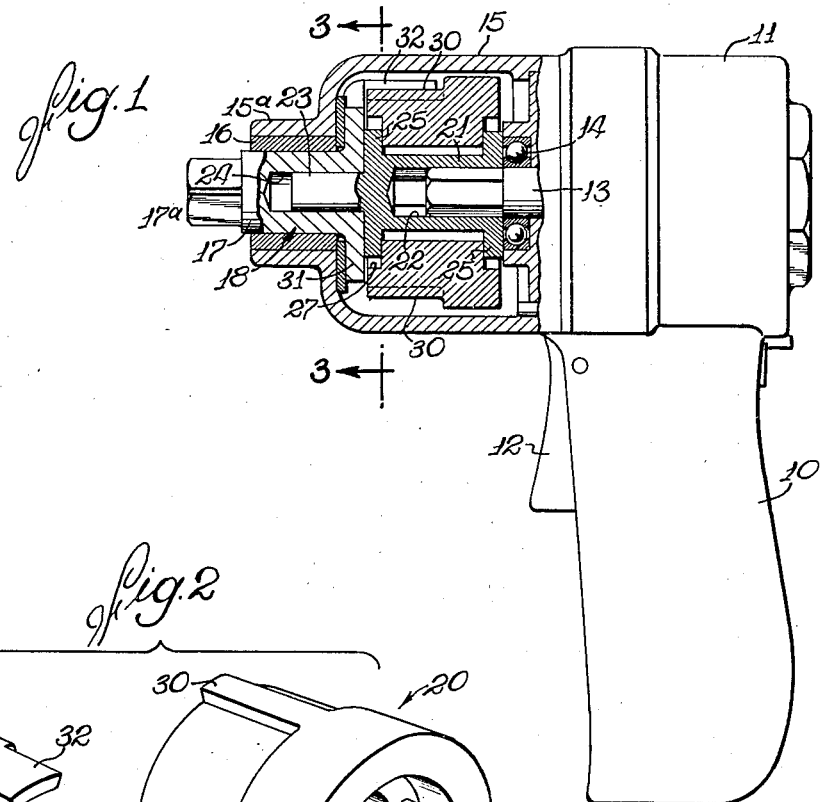
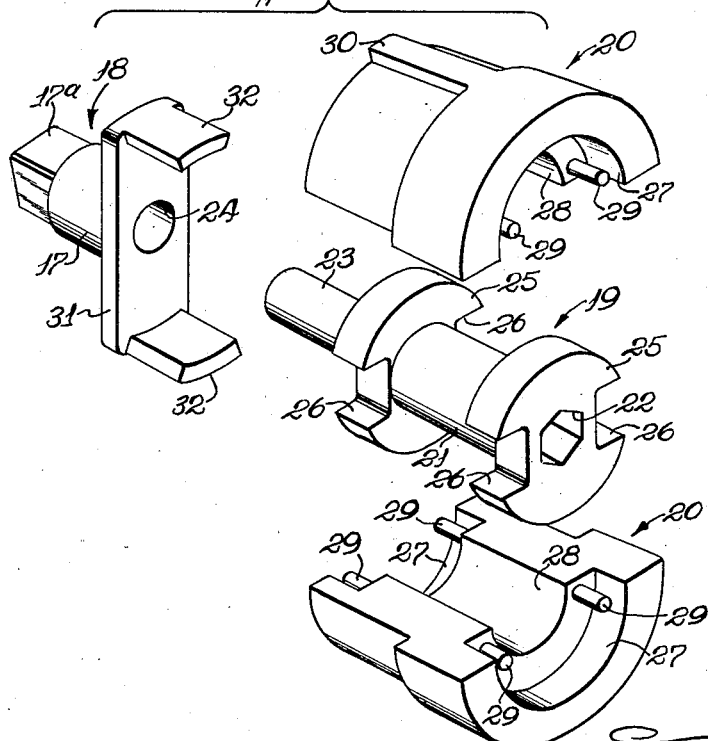
INVENTOR
Ernest H. Shaff
By Parker, Carton, Pitzner Hubbard
ATTORNEYS March 7, 1944. E. H. SHAFF 2,343,332
IMPACT CLUTCH
Filed Aug. 6, 1941  2 Sheets-Sheet 2
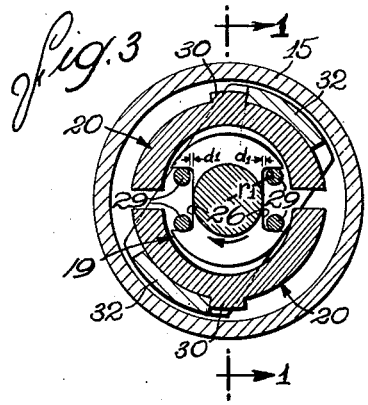
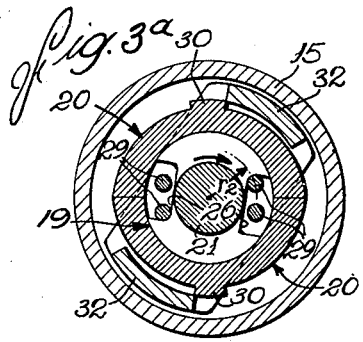
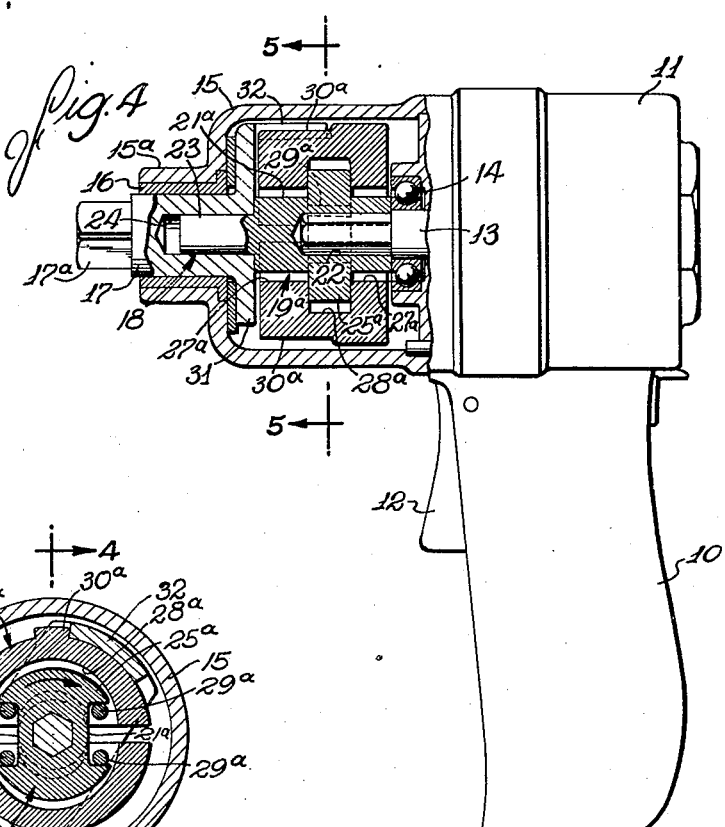
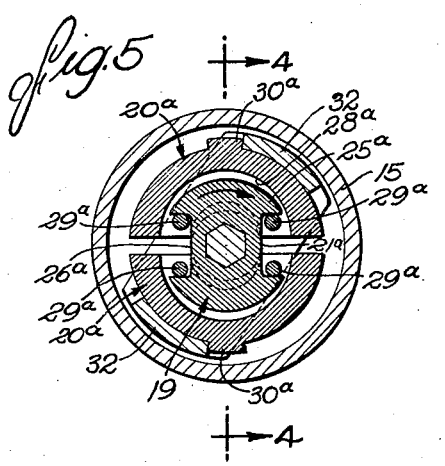
INVENTOR
Ernest H. Shaff
ATTORNEYS Patented Mar. 7, 1944

2,343,332

UNITED STATES PATENT OFFICE 2,343,332

IMPACT CLUTCH

Ernest H. Shaff, Grand Haven, Mich., assignor to William H. Keller, Inc., Grand Haven, Mich., a corporation of Michigan Application August 6, 1941, Serial No. 405,599

14 Claims. (Cl. 192—30.5)

The invention relates to impact clutches of a type particularly adapted to meet the requirements of use in a so-called nut runner or impact wrench.

One object of the present invention is to provide a clutch of the type indicated which is characterized particularly by its ruggedness and simplicity of construction, as well as by its low cost and smoothness of operation.

Another object is to provide in a reversible impact clutch which utilizes flat or abrupt impact surfaces, a novel and simplified arrangement of the parts for automatically engaging and disengaging the impact surfaces.

More specifically, it is an object of the invention to provide a novel impact clutch of the general type indicated embodying an improved and simplified arrangement for utilizing centrifugal weights for effecting engagement of the clutch.

Still another object is to provide an impact clutch utilizing centrifugal weights for effecting clutch engagement, together with a novel connection of the weights to a revoluble driver of such character that the connection performs the threefold function of causing the weights to revolve with the driver; second, limiting the radial displacement of the weights under the compulsion of centrifugal force; and, third, shifting the weights inward to disengage the clutch upon turning of the driver relative to the weights as a result of the application of a predetermined torque load on the clutch.

Further objects and advantages of the invention will become apparent as the following description proceeds, taken in connection with the accompanying drawings, in which:

Figure 1 is a side elevation, partly in longitudinal section along the line 1—1 in Fig. 3, of an impact wrench provided with a clutch embodying the present invention.

Fig. 2 is an exploded perspective view of the impact clutch included in the device of Fig. 1.

Fig. 3 is a transverse sectional view, taken substantially along the line 3—3 in Fig. 1, this being a stop-motion view with clutch elements shown in engaged position.

Fig. 3a is a sectional view, similar to Fig. 3, but showing the clutch elements in disengaged position.

Fig. 4 is a side elevation, partially in longitudinal section along the line 4—4 in Fig. 5, of an impact wrench similar to that of Fig. 1 but provided with a clutch mechanism of modified form, also embodying the invention.

Fig. 5 is a transverse sectional view, taken substantially along the line 5—5 in Fig. 4.

While the invention is susceptible of various modifications and alternative constructions, I have shown in the drawings and will herein describe in detail certain preferred embodiments thereof, but it is to be understood that I do not thereby intend to limit the invention to the specific forms disclosed, but intend to cover all modifications and alternative constructions falling within the spirit and scope of the invention as expressed in the appended claims.

Referring more particularly to the first exemplification herein of the invention, the device shown in Fig. 1 is an impact wrench or nut runner of the general class used for power driving of nuts, bolts, screws, etc., in applying or removing the same. It comprises a pistol grip handle 10 to which is fixed a cylindrical casing 11 of a reversible pneumatic motor driven by compressed air supplied from a suitable source (not shown) under the control of a trigger 12 in the manner common for such pneumatic tools. From the forward end of the motor casing 11 projects a motor shaft 13, journaled in suitable anti-friction bearings 14. This motor shaft extends within a cylindrical housing or casing 15 fixed to the motor casing 11 and having a reduced outer end portion 15a in which is journaled, in a sleeve bearing 16, the spindle portion 17 of a revoluble driven member, designated generally as 18. The spindle 17 has a squared outer end 17a to which may be applied a suitable socket wrench head or the like for engagement with a nut or other member which is to be turned.

Within the housing 15 is enclosed an impact clutch embodying the present invention and which, in this instance, serves to couple the motor shaft 13 to the driven member 18. In general, the clutch is such that so long as the torsional resistance to rotation of the driven member 18 does not exceed a predetermined maximum, the driven member will revolve in unison with the drive motor shaft 13. When the maximum torque resistance is reached, however, an intermittent disengagement and re-engagement of the clutch takes place automatically with a sharp hammer blow delivered by the clutch to the driven element upon each such re-engagement so that the nut or other member being turned is hammered to effect its rotation. The clutch is reversible in operation, whereby the same general type of action may be obtained for either direction of rotation for the motor shaft 13. Accordingly, the power wrench shown can be used for, say, either threading a nut onto a bolt or removing it from the same.

The illustrative impact clutch (see Fig. 2) comprises as its principal elements the driven member 18 heretofore noted, a driver designated generally as 19, and a pair of centrifugal weights or hammers 20. The driving and driven impact surfaces of the clutch, hereinafter detailed, are formed on elements rigid, respectively, with the weights 20 and the driven member 18. As the driver 19 revolves it carries with it the weights 20 so that they are impelled radially outward by centrifugal force, thereby effecting engagement of the clutch. Imposition of a predetermined torque load on the clutch results in an automatic retraction of the weights, thereby freeing the impact surfaces on the weight or hammer members from those on the driven or anvil member 18, so that the weights are disconnected from the driven member and as they revolve freely they are again thrown back out, by centrifugal force, for reengagement of the clutch.

Turning now to the matter of the illustrative structural form of individual ones of the several elements of the clutch listed above, it will be seen upon reference to Figs. 1 and 2 that the driver 19 comprises a shaft 21 with a longitudinal bore 22 in it of hexagonal cross section. Slidably received within this bore is the complementally shaped end of the motor shaft 13 so that the driver shaft is rigidly coupled for rotation with the motor shaft. Integral with the outer end of the driver shaft 21 is an extension 23 of reduced diameter received within a longitudinal bore 24 in the driven member 18. The extension 23 is freely journaled in this latter bore 24 in order to support the outer end of the driver.

Integral with the opposite end portions of the driver shaft 21 are enlarged generally disk-shaped heads 25 having diametrically opposed notches 26 formed in their peripheries. It will be observed that these notches are generally rectangular in shape and that opposed end walls thereof comprise flat surfaces 26a lying on chords of circles coaxial with the driver (see also Fig. 3) and facing generally forwardly for corresponding opposite directions of rotation of the driver.

The pair of centrifugal weights 20 are of identical construction and comprise two complemental half-shells nested about the driver 19 when in assembled relation. Thus, each of the weights 20 has arcuate recesses 27 in its opposite ends which are shaped to fit loosely about the heads 25 on the driver while the inner central portion of the weights is arcuately contoured as indicated at 28 to fit loosely about the driver shaft 21.

The means for connecting the weights 20 to the driver 19 is deserving of particular attention. The function of this connection is threefold, being first, to connect the weights to the driver so that they will revolve substantially in unison with it whereby to apply centrifugal force to the weights; second, to limit the outward movement of the weights under the compulsion of centrifugal force; and third, to not only permit a relative movement between the driver and weights in a rotational direction when a predetermined maximum torque load is imposed on the clutch, but also to utilize such relative rotational movement of the driver and weights to effect a retraction of the latter to disengage the clutch. In the illustrative construction, the connecting means includes four pins 29 rigidly fixed to each of the weights 20 with a pair of pins at each end of each weight. These pins all extend parallel to the axis of rotation of the driver 19 and each of them is loosely received within a corresponding one of the notches 26 in the driver heads 25. The pins and notches are so dimensioned and located relative to each other that when the driver is revolving the weights 20 can move outward, under the compulsion of centrifugal force, to the respective outer limit positions therefor shown in Fig. 3. The further action of the pins and notches in effecting the operation of the clutch will be detailed hereinafter.

The exterior surfaces of the weights 20 are relieved to form longitudinally extending clutch teeth or ribs 30 thereon. These teeth present abrupt side impact faces or shoulders which lie substantially in planes coincident with the axis of the driver (see Fig. 3). These teeth 30 constitute the driving teeth of the clutch and the driven teeth are included in the driven member 18.

In the present instance the driven member 18 is of a yoke-shape and comprises a transverse member or bar 31 (Fig. 2) integral with the spindle 17. Integral with the outer ends of this transverse member 31 are two diametrically opposed and longitudinally extending teeth or yoke arms 32 having abrupt impact faces on their opposite side edges complemental to the impact faces on the driving teeth 30. The driven teeth 32 are adapted to revolve in a fixed orbit encircling the weights 20 (see Figs. 1 and 3) and the weights are so dimensioned that when they are drawn together to their inner limit positions (shown in Fig. 3a) they may revolve freely between the pair of driven teeth 32 without contacting the latter. In other words, the outside diameter of the shell, comprised of the two half-shell weights 20, is slightly less than the internal diameter between the inner faces of the teeth 32. On the other hand, when the weights 20 are thrown outward to their other or outer limit positions (Fig. 3) by the action of centrifugal force, the driving teeth 30 thereon strike against the driven teeth 32 and revolve the driven member 18.

The number and circumferential length of the driving and driven teeth 30 and 32 of the clutch are of importance in the particular device illustrated. As will be observed upon reference to the transverse sectional view of Fig. 3, the total circumferential length of each pair of driving and driven teeth is in the order of magnitude of ninety degrees. Since there are two such pairs of teeth in the clutch, the result is that when one of the driving teeth 30 moves under a driven tooth 32 and finally out from beneath it, its weight 20 is permitted to turn through well in excess of ninety degrees before its driving tooth 30 reaches the next successive driven tooth 32. Because of this long free travel between engaging positions, the weight 20 in question has ample time to come up to speed and to be thrown outward by centrifugal force for full engagement of its driving tooth with the next successive driven tooth, and so that the latter will be struck a full, hard hammer blow.

In the operation of the wrench described, the air motor is started and its shaft 13, which is connected with the driver 19, revolves the latter in a corresponding direction. With no load or a light load on the wrench, as for example in threading a nut onto a bolt, the weights 19 are not only impelled outward by centrifugal force, but are retained in their outermost or projected positions (shown in Fig. 3) substantially continuously. While in such position the driving teeth 30 on the weights are retained in engagement with the driven teeth 32 so that the driven member 18 revolves in unison with the driver and the nut is thus rapidly threaded into place. As the nut approaches its limit position on the bolt threads, the resistance to turning increases. Finally the resistance becomes so great that the driver 19 turns, in its direction of rotation, relative to the weights 20, moving from the position of Fig. 3 to that of Fig. 3a. Such turning of the driver relative to the weights causes the trailing end walls of the notches 26, which face generally forward in the direction of rotation, to pull the adjacent pins 29 inward toward the axis of rotation of the driver and thereby draw the weights 20 inward so that their driving teeth 30 are disengaged from the driven teeth 32. With the clutch teeth thus disengaged the driver and weights rapidly come up to speed again so that before the driving teeth reach the next successive driven teeth the weights will have been thrown outward to their full extent, whereby the driving teeth will strike sharply against the next successive driven teeth which they reach. On striking such a blow the rotation of the weights 20 is sharply arrested, their momentum or kinetic energy being dissipated in the blow, so that there is substantially no centrifugal force acting upon them. Thereupon the trailing ends of the notches 26 again act on the adjacent pins 29 to pull the weights inward and thus again disengage the clutch teeth. This operation is repeated and continued with a sharp hammer blow delivered to the driven member or anvil 18 upon each successive re-engagement of the clutch so that the nut being operated upon is hammered into place. It will of course be understood that in removing a nut from a bolt the process is substantially reversed. In other words, the nut is hammered loose and then as the resistance to turning offered by the nut decreases the clutch of the impact wrench remains in engagement while the nut is rapidly and freely threaded off the bolt.

In connection with the operation of the notches and pins in retracting the weights 20, it will be observed upon reference to Fig. 3 that the distance between the bottoms of the notches 26 is slightly less than the distance between opposed sides of each pair of pins 29, so that there is a small clearance $d_1$ between the sides of the pins and the bottoms of the notches when the weights are in their outer position. This clearance can be quite small, however, since the radial displacement $r_1$ of the pins 29, when the weights are in their outer positions, is only slightly less than the radial displacement $r_2$ when the weights are in their retracted position shown in Fig. 3a. In other words, the inward shift or displacement of the leading pin 29 on each weight, through the small distance represented by the difference between $r_1$ and $r_2$ is sufficient to move the driving tooth 30 on the weight inward a substantially greater distance, equal to the height of the tooth face, so as to clear it from the corresponding driven tooth.

Also to be particularly noted is the symmetrical location of the connecting means, between the driver and weights, relative to the teeth 30 on the weights. As heretofore noted there are at least two abutments, shown as the heretofore described pins 29, on each weight coacting with corresponding abutments, shown as the walls of notches 26, on the driver. One coacting or engaging pair of abutments is at one side, in a circumferential direction, of the rib 30 and the other pair is at the other side. Both pairs of abutments are in engagement when the weight is fully projected outward (Fig. 3) but it is always the leading pair which coact to effect weight retraction in the manner previously described (Fig. 3a). For one direction of rotation one pair is leading and in the other direction the other pair is leading, and hence active in retraction, but since two symmetrically located pairs are provided the same type of action is accomplished for either direction of rotation. Furthermore, since one or the other of the pair of abutments noted do lead for corresponding directions of rotation, they can pull the weight inward, as described, upon turning of the driver forward, relative to the weight.

The modified form of clutch, embodied in the wrench of Figs. 4 and 5, differs from that described above only in that the driver has a single, centrally-located, notched enlargement on it, engaged by pins on the weights, instead of two end enlargements like elements 25 in Fig. 1. Accordingly, the same reference numerals have been used for the remaining parts, which are identical with those heretofore described. In Figs. 4 and 5 the driver is designated as 19$^a$ and comprises a shaft 21$^a$ with a base 22 in it, receiving the motor shaft 13 as before. Integral with the central portion of the driver shaft 21$^a$ is a disk-shaped enlargement or head 25$^a$ with a pair of diametrically opposed notches 26$^a$ in it, corresponding in size and shape to the notches 26. Embracing the driver 19$^a$ is a pair of centrifugal weights 20$^a$. On the inner side of each of these weights is an arcuate recess 28$^a$ to receive the head 25$^a$, while at 27$^a$ the weights are arcuately faced to loosely embrace the driver shaft 21$^a$. Rigid with each of the weights is a pair of longitudinally extending pins 29$^a$, disposed in respective ones of the notches 26$^a$. On the exterior of its weights are driver teeth coacting with the driven teeth 32 just as before. It will be appreciated that the operation of the wrench of Figs. 4 and 5 is substantially identical with that of Figs. 1 to 3, heretofore detailed.

From the foregoing, it will be appreciated that the illustrated wrench structures are extremely simple to manufacture, requiring, as they do, such a small number of parts. Moreover, these parts are of a form which can be readily made very rugged and well adapted to withstand heavy punishment during use. Nevertheless, the illustrated wrenches operate smoothly and efficiently, serving to rapidly hammer-rotate even strongly resistant nuts or bolts or the like.

I claim as my invention:

1. An impact clutch comprising, in combination, a revoluble driver having a first pair of abutments thereon located at points spaced circumferentially about the axis of driver rotation, said abutments presenting substantially flat abutment surfaces facing respectively generally forwardly for corresponding opposite directions of driver rotation, a weight having a portion loosely embracing the portion of the driver between said first pair of abutments and having a second pair of abutments rigid with said weight and slidably contacting said surfaces of said first pair of abutments, a driving tooth rigid with the outer portion of said weight and disposed generally equidistantly between said second pair of abutments, and a driven member revoluble coaxially with said driver and presenting a pair of impact shoulders engageable alternatively by said driving tooth during rotation of said weight by said driver in respective opposite directions.

2. An impact clutch having coaxially supported driving and driven members, an anvil element on the driven member offset radially outward from the axis thereof and at one side of the driving member, a hammer member interposed between said driving member and said anvil element, said hammer member and said anvil element having substantially radial shoulders, and means connecting said hammer member with said driving member for rotation thereby while permitting outward shifting movement of the hammer member by the action of centrifugal force to effect the interengagement of said impact shoulders, said connecting means including a pair of slidably engaging abutments rigid with said driving member and said hammer member, respectively, and interengaging at a point angularly advanced a substantial distance from said shoulders when the latter are in interengaging relation.

3. An impact clutch having, in combination, driving and driven members supported for rotation on a common axis, and a hammer member shiftable radially outward relative to said driving member, said driven member and said hammer member having impact surfaces engageable when the hammer member is in its outermost position relative to said driving member, and the driving and hammer members having slidably engaging abutments rigid therewith and operative as an incident to the interruption in rotation of said driven member for retracting said hammer member as an incident to rotation of said driving member relative to said hammer member, said abutments being positioned for interengagement at a point spaced in the direction of rotation substantially in advance of a radius passing through the interengaging impact surfaces.

4. An impact clutch comprising, in combination, coaxially mounted driving and driven members, said driven member having rigid therewith a pair of anvil elements disposed on diametrically opposite sides of the driving member and extending parallel thereto but spaced outwardly therefrom, a pair of radially shiftable arcuate hammer members embracing opposite sides of said driving member and each having a centrally disposed impact shoulder engageable with one of said anvil elements in the outermost position of the hammer members, said driving member having two pairs of diametrically disposed abutments and said hammer members having retracting elements engageable by said abutments as an incident to an interruption of the rotation of the driven member in either direction whereby to disengage said impact shoulders from the anvil elements.

5. An impact clutch comprising, in combination, a driver and a driven member supported for independent coaxial rotation, a weight, means supporting said weight on said driver for limited movement radially outward therefrom from an inner limit position to an outer limit position under the compulsion of centrifugal force as the driver revolves, mating clutch teeth rigid respectively with said weight and said driven member and positioned for engagement during either direction of rotation of said driver when said weight is in said outer limit position, but said teeth being dimensioned to clear each other for free rotation of the weight relative to said driven member when said weight is retracted to said inner limit position, and said supporting means including abutments on said driver and weight, respectively, presenting slidably engaging surfaces and coacting to shift said weight inward to said inner limit position to free said teeth in response to the imposition on said supporting means of a predetermined maximum torque load in either direction of rotation of said driver and weight.

6. An impact clutch comprising, in combination, a driver and a driven member supported for independent coaxial rotation, a weight, means supporting said weight on said driver for limited movement radially outward therefrom under the compulsion of centrifugal force as the driver revolves, mating clutch teeth rigid respectively with said weight and said driven member and positioned for engagement when said weight is displaced radially outward a predetermined distance relative to the driver, said teeth all presenting abrupt impact surfaces lying substantially in planes coincident with the axis of driver rotation, but said teeth being dimensioned to clear each other for free rotation of the weight relative to said driven member when the weight is retracted toward the axis of the driver to an inner limit position, and said supporting means including abutments on said driver and weight, respectively, presenting slidably engaging surfaces and coacting to shift said weight inward to said inner limit position to free said teeth in response to the imposition on said supporting means of a predetermined maximum torque load.

7. An impact clutch comprising, in combination, a revoluble driver, a weight having a driving impact shoulder rigid therewith, a driven member revoluble coaxially with said driver and presenting a driven impact shoulder thereon engageable by said driving shoulder on said weight only when the latter is displaced radially outward from the driver's axis of rotation a predetermined distance, and means for connecting said weight to said driver for rotation therewith and for limited movement radially of the driver's axis of rotation under the compulsion of centrifugal force, said last-mentioned means including a first abutment rigid with said weight and a second abutment slidably contacting the first abutment and rigid with said driver, said abutments being disposed to limit by their engagement the displacement of said weight radially outward from the axis of said driver under the compulsion of centrifugal force and to draw said weight inward toward said axis to disengage said impact shoulders in response to turning of said driver relative to said weight in the direction of driver rotation.

8. An impact clutch comprising, in combination, a revoluble driver, a weight having a driving impact shoulder rigid therewith, a driven member revoluble coaxially with said driver and presenting a driven impact shoulder thereon engageable by said driving shoulder on said weight only when the latter is displaced radially outward from the driver's axis of rotation a predetermined distance, and means for connecting said weight to said driver for rotation therewith and for limited movement radially of the driver's axis of rotation under the compulsion of centrifugal force, said connecting means including an opening in said driver presenting an abutment surface facing generally in the direction of rotation of said driver required to bring said impact shoulders together, and said connecting means also including an abutment rigid with said weight and loosely engaging said surface to slide across the same, the engagement of said abutment on said weight with said surface serving to limit the displacement of said weight radially outward from the axis of said driver under the compulsion of centrifugal force and to draw said weight inward toward said axis to disengage said impact shoulders upon turning of said driver relative to said weight in said direction of driver rotation.

9. An impact clutch comprising, in combination, a revoluble driver having a plurality of peripheral notches therein, a weight shaped to loosely embrace the periphery of the driver between a pair of said notches, said weight having projections thereon hooked loosely into said pair of notches and engaged with end walls of the latter facing generally forwardly for respective opposite directions of driver rotation, such engagement of said projections with said notches serving to connect the weight to turn with the driver but limiting the outward displacement of the weight under the compulsion of centrifugal force, each of said end walls of the notches being shaped to pull its corresponding projections inward toward the driver axis upon turning of the driver relative to the weight in the direction of driver rotation toward which such notch end wall faces, whereby to draw the weight inward toward the driver axis of rotation, a revoluble driven member presenting a pair of oppositely facing driven impact shoulders, and oppositely facing driving impact shoulders on said weight alternately engageable with corresponding ones of said driven impact shoulders in the course of rotation of said weight in corresponding opposite directions.

10. An impact clutch comprising, in combination, a revoluble driver having a plurality of longitudinally extending openings therein, a weight shaped to loosely embrace the periphery of the driver between a pair of said openings, the latter presenting walls facing respectively generally forwardly for opposite directions of driver rotation, said weight having longitudinally extending pins of round cross-section rigid therewith hooked loosely into said pair of openings, the engagement of said pins with said walls of the openings as the driver revolves serving to limit the outward displacement of the weight under the compulsion of centrifugal force, each of said walls being shaped to pull its corresponding pin inward toward the driver axis upon turning of the driver relative to the weight in the direction of driver rotation, whereby to draw the weight inward toward the driver axis of rotation, a revoluble driven member presenting a pair of oppositely facing driven impact shoulders, and oppositely facing driving impact shoulders on said weight alternatively engageable with corresponding ones of said driven impact shoulders in the course of rotation of said weight in corresponding opposite directions.

11. An impact clutch comprising, in combination, a reversible rotatable driver having a pair of peripheral notches therein located on opposite sides of the driver's axis of rotation, each of said notches presenting opposed end walls joined by an outwardly facing bottom wall, a pair of weights of half-shell form embracing the periphery of said driver, each of said weights having a pair of pins rigid with its opposite side portions and projecting longitudinally of the weight into a corresponding one of said notches, each of said weights having a longitudinally extending impact rib on its periphery located symmetrically with respect to the pins on the corresponding weight, said pins being positioned relative to said notch end walls to permit limited movement of the corresponding weight radially outward of the driver and relative to said notch bottom walls to permit relative movement between weight and driver transversely of the latter's axis, and a driven member revoluble coaxially with said driver and presenting a pair of oppositely facing driven impact shoulders engageable by said ribs when said weights are thrown radially outwardly from said driver the maximum distance permitted by engagement of said pins with said notch end walls.

12. An impact clutch having, in combination, an annular casing, driving and driven members supported for independent rotation on a common axis in said casing, a pair of arcuate weights loosely disposed on opposite sides of the driving member in embracing relation to it and guided for radial movement thereby, said weights having centrally disposed impact shoulders on their peripheries, a pair of anvil elements rigid with said driven member and engageable by said shoulders, and means actuated by said driving member as an incident to the interruption of rotation of said driven member in either direction to retract said impact shoulders from engagement with said anvil elements.

13. An impact clutch having, in combination, driving and driven members supported for independent rotation on a common axis, said driving member being generally cylindrical in form and said driven member having a pair of anvil elements spaced radially outward from and parallel to said driving member, a pair of arcuate weights loosely mounted between said driving member and said anvil elements and each having a central radially projecting rib for coaction with said anvil elements, said weights being disposed to embrace said driving member and being rotatable with said driving member and shiftable outwardly by the action of centrifugal force to carry said ribs into position for engagement with said anvil elements, and means operative as an incident to the interruption of rotation of the driven member to effect positive withdrawal of said ribs from said anvil elements.

14. An impact clutch comprising, in combination, a revoluble driver, a weight having an impact shoulder rigid therewith, a driven member revoluble coaxially with said driver and presenting a driven impact shoulder thereon engageable by said driving shoulder on said weight only when the latter is displaced radially outward from the driver's axis of rotation a predetermined distance, and means for connecting said weight to said driver for rotation therewith and for movement radially of the driver's axis of rotation under the compulsion of centrifugal force, said last-mentioned means including a first abutment rigid with said weight and a second abutment slidably contacting the first abutment and rigid with said driver, said abutments being disposed to draw said weight inward toward said axis to disengage said impact shoulders in response to turning of said driver relative to said weight in the direction of driver rotation.

ERNEST H. SHAFF.